Patented May 1, 1934

1,956,866

UNITED STATES PATENT OFFICE

1,956,866

RESINOUS PANEL BOARD AND METHOD OF PRODUCING SAME

Charles L. Keller, Cincinnati, Ohio, assignor to The Richardson Company, Lockland, Ohio, a corporation of Ohio No Drawing. Application August 13, 1931, Serial No. 556,933

23 Claims. (Cl. 92—21)

The primary object of my invention is the provision of a panel board containing fibrous reinforcement, and a binder comprising a synthetic resin and other heat plastics or binder materials. Panels of synthetic resin material have hitherto been made by pressing from a mixture of resinous binder and filler materials, or by saturating preformed plies of fabric, or the like, with condensation resin, and consolidating these plies by heat and pressure. It has also been a practice to manufacture pulps containing synthetic resins, and to produce felted structures from such pulps on the screen of paper-making machines. Some of these procedures have been relatively expensive, particularly as to the amount of binder employed therein; and the manufacture of panels by molding operations alone has involved considerable expense and inconvenience.

The primary object of my invention is to provide panels, panel boards and similar structures, or articles in which such structures serve as raw material, comparable in appearance and properties to anything which has been produced heretofore, but greatly lessened in expense thereover. It is my object to produce a structure having the properties and appearance of molded synthetic resin compounds or saturated structures, but very much less expensive in cost of materials and cost of production. It is my object to provide a process of making such structures in which the steps are simplified, and in which the desired end product is more easily obtained. It is still another object of my invention to provide a structure of the class referred to, in which the binder is less expensive than synthetic resin alone. It is still another object of my invention to provide a method whereby in an ultimate product a synthetic resin binder may be combined or associated with other binder substances, to the end of producing a less expensive product, and without disorganization of process steps such as the production of felted materials from pulps upon the screen of the paper-making machine.

These and other objects of my invention, which will be set forth hereinafter or will be apparent to one skilled in the art upon reading these specifications, I accomplish by that certain process and in that product of which I shall describe certain exemplary embodiments.

As hereinabove indicated, it is my object in panels, boards, or similar structures designed to have the properties of synthetic resinous compositions, to combine with synthetic resin less expensive binders, chief among which are the bitumens. In the class of synthetic resins, I include not only the well-known phenol-formaldehyde resins, but also other synthetic materials adapted by chemical condensation or other reaction, sometimes assisted by heat and pressure, to come into a hard, relatively impervious, insoluble and/or infusible condition, and of these many are well known. In the term "bitumen" I intend to include not only asphalts and their derivatives, but also the various tars, pitches, waxes, natural resins, natural bitumens, such as Gilsonite, gums and the like.

Other binder substances are also capable of employment in my process and product. One of these is rubber. Rubber may be introduced into a sheet in the process of manufacture of said sheet or subsequent to felting, in the vulcanized or unvulcanized forms, or in the form of latex or otherwise. Consequently I desire the term "binder" to be construed broadly to cover organic or inorganic binders in general, and not to be restricted to a technical definition of bitumen.

Again, while in the exemplary embodiment of my disclosure I deal with a felted sheet, my invention embraces articles of other form, for example, but without limitation, articles having a felted structure and more or less completely formed, by blowing, molding or otherwise, before the introduction therein of the resin by impregnation or saturation. Pulp, containing binder or not, may be blown or otherwise preformed to ultimate shape, or to a shape suitable for finished molding, and then treated with the resin, for the manufacture of even the most complicated shapes. Or a pulp, containing binder or not, may be felted into sheets or other shapes, and then preformed in suitable manner, prior to the treatment with resin.

In the exemplary embodiment of my invention I shall describe a product in which the ultimate binder is a mixture of cured condensation resin such as bakelite, and a bitumen such as asphalt. So far as I am aware, it has not hitherto been proposed to make felted panel boards or similar structures of condensation resin containing other binder substances. Had the problem presented itself, difficulty would have arisen in the securing of a proper and adequate mixture of binder substances, and the introduction thereof into the board. I claim as novel herein both my preferred process and an article which, in its broadest aspect, is a felted structure containing a binder substance comprising synthetic resin and a bitumen, cured and consolidated under heat and pressure.

Briefly, in the practice of my invention I have found that if felted structures be produced containing a bituminous substance, and if the structure be saturatable, I can introduce the condensation resin in controlled amounts by a saturating or re-saturating process prior to the time of the final curing under heat and pressure. The ultimate treatments which the panel or other structure receives in the finishing thereof, amalgamates the binder substances and produces a unitary result. In this way I am enabled not only to introduce into the board what in the last analysis will be a mixed binder substance, but I am also enabled to control and gauge the amounts of the various substances employed. Under certain circumstances, I can produce a product in which the binder varies in a useful manner in different parts of the article, to the end of effecting a further lowering of the cost or a variation in the physical properties of the article at different points in the surface or bulk thereof.

Preferably I form a felted structure as the foundation of my improved article. By a felted structure I mean a structure formed by felting a fibrous pulp upon a screen. Paper or felt machine products are examples of such structures, but are not limitations upon my invention. My invention may be practiced upon articles formed from pulps on or within molds, or the like. The kind and character of the fiber employed may be varied to suit different conditions. Pulp of which the felted structure is formed may, if desired, carry with it a portion of the binder substances. There is no limitation upon the nature of the pulp, or the manner of incorporation of the binder substances therewith, if such binder substances are incorporated prior to the felting step. For example, bitumen may be combined with the pulp in any of the known ways, either by comminuting a hard product and mixing it as such with the pulp, or by rendering a soft product non-adhesive in comminuted form, as by emulsification, and mixing it with the pulp. A pulp of feltable fibers in water suspension with which the binder has stability of association is, however, preferred by me, particularly one in which the binder particles exist in substantial part in direct, adhesive contact association with the fibers. Such pulp may be made in accordance with the teaching of United States Letters Patent No. 1,771,150 to Stevenson and Buron.

In some instances it will be possible to form up the sheet without the inclusion of a binder substance, afterward introducing a binder substance therein by a saturation process. Thus a sheet may be formed up without binder and then partially saturated with a bitumen such as asphalt for example while wet or dry, either by direct treatment in the liquid bituminous substance, or by being immersed in a solution of the bitumen in a suitable solvent. In the following of my process, however, if these expedients are chosen, care must be exercised to see that the resulting sheet containing the binder substance is still in an open and saturatable condition. So far as my process is concerned, there is, therefore, a distinct advantage in the felted product of a pulp containing comminuted binder substance, in that the sheet as formed retains an open and saturatable character, providing, of course, that the binder therein is not too great in amount, or that the sheet, by some after treatment, is not substantially and completely saturated, filling up the voids therein, and rendering it incapable of taking up additional saturant.

Having formed or produced a felted fibrous sheet containing a binder substance, I next add an additional and usually a different binder thereto by a process of saturation. In the practice of my process, it is preferable either to form the sheet with the bituminous component of the binder therein, or to form the sheet and introduce the bituminous binder therein prior to the addition of more binder, which, in the preferred form of my invention, will be a synthetic resin, curable to hard, insoluble and/or infusible condition. The resinous binder when introduced, will preferably be in one of the intermediate stages of condensation, and may be thinned with a solvent if desired. By saturation or impregnation, this binder is introduced into the board containing the other binder. The saturation or impregnation is carried to the extent desired, and will usually be sufficient in amount, when taken with the other binder, to fill the interstices of the sheet under the heat and pressure of the final curing stage, so that the end product will be a substantially impervious result.

In this way I am enabled to gauge very accurately the quantities of binder substances employed in the final sheet without the necessity of making up in the first place a composite binder, which would be more difficult to introduce into the sheet, and which, in any event, would involve a separate step in the process. When working with asphalt and with synthetic resin, the problem is very much simplified because I do not have to form an initial mix of asphalt and resin, taking precautions to secure homogeneity and to prevent the curing of the resin before the introduction of the binders is effected. In my process the binder substances are introduced in two stages, and their intermixture is effected in the sheet or board. Thus the problem of the introduction of each binder is a problem which is separately solved because carried out in separate stages of my process. I have discovered that during the initial curing stages, a very effective mixture of binders is produced in the sheet, and amalgamation occurs to the extent of producing an article in which the binder is homogeneous, and possesses to a greater or less extent the characteristics of the synthetic resin in spite of the fact that considerable quantities of other binder materials may be present. I attribute this ready interfusion and the homogeneity which results therefrom to the fact that the different binder substances exist in the sheet or board before the final curing in the form either of films or of minute particles, or both.

Yet it is possible in my process, particularly when employing webs of considerable thickness, to carry on the saturation or impregnation with the second binder to a controlled extent. Thus with a relatively thick board or panel of fibrous material containing a bituminous binder, I may impregnate the surface layers to a greater or less extent with the synthetic resin without causing the penetration and saturation thereof entirely through the web. Upon the final heat treatment the surfaces of such a product will be characterized by a relatively homogeneous mixture of resin and bitumen as a binder, but the quality of the binder will vary from the surfaces toward the interior of the sheet where the bitumen predominates. In this way may be made articles having surfaces of the character of hard, cured, insoluble and/or infusible resins and bodies of the character of asphaltic compositions, whereby not only is the cost of the resin saved to some extent, but the article itself has a greater resistance to shock than it might have otherwise.

In an exemplary procedure I may form a pulp of feltable fibers and mix with this pulp comminuted, hard, bitumen, or emulsified soft bitumen, to the extent desired, or I may form a pulp in accordance with the teachings of said Letters Patent 1,771,150, in which the bitumen will be stably associated with the fibers. In any of these pulps I may, by way of example, provide 30 parts of the bitumen by weight to 40 parts of the fiber by weight, or I may employ any other proportions suitable to the desired characteristics of the end product. The pulp will be felted upon a screen and will be dried more or less, as may be desired. When completely formed, it may then be impregnated with a synthetic resinous substance in an intermediate and uncured stage. This impregnation may be carried on to the extent of introducing into the sheet an additional 30 parts by weight of binder substances. In the final sheet there will thus be 60% of binder by weight to 40% of fibers. Filler materials may, of course, be added if desired. If a solvent has been employed in the saturation step, it will then be usual to dry the sheet. Afterward it is treated under heat and pressure to amalgamate the binder substances as hereinabove described, and cure the synthetic resin, whereupon the sheet, panel or board is a completed article.

If solvents are employed in connection with the introduction of binder substances in several stages rather than in one stage, the solvent may be so chosen as not to interfere with the disposition of the previous binder substance already in the sheet. In some instances, however, a second binder substance may be advantageously employed in such a way as in part at least to displace a previous binder substance in the surface layers and to drive it into the center of the sheet.

I have found that I may take a felted product formed by the paper machine, or otherwise, and containing a binder substance and saturate such a sheet with synthetic resin, securing thereby a product which may be assembled in layers or laminations and cured as such, and which contains sufficient of binder substance to produce a unitary, integral structure of such laminations under such curing. It is a characteristic of so-called premixed pulps, such as those made in accordance with the teachings of the patent hereinabove referred to, that providing they contain sufficient binder substance they may be molded by plastic flow under heat and pressure. If I take felted structures of such pulps and saturate or re-saturate them with synthetic resins, the product prior to the final curing stage will likewise be capable of developing heat plastic characteristics so that mold charges may be cut therefrom and molded by plastic deformation in suitable dies prior to or as a part of the final curing operation.

Having thus described my invention, what I claim as new and desire to secure by Letters Patent, is:—

1. A felted structure comprising fibers in felted formation and a composite binder of bitumen and synthetic resin.

2. A felted fibrous article containing a homogeneous combination of bitumen and synthetic resin.

3. A panel or the like article comprising a structure of felted fibers and a binder of asphalt and condensation resin.

4. A panel or the like article comprising a structure of felted fibers and a binder of asphalt and condensation resin, said article containing the resin in a cured stage, whereby said article has a hard and impervious surface.

5. A panel or the like article comprising a structure of felted fibers and a binder of asphalt and condensation resin, the proportion of said resin to said asphalt varying in different parts of said article.

6. An article comprising a structure of felted fibers, and a binder in which synthetic resin is mixed with bitumen, the proportion of said resin to said bitumen being greater at the surface of said article.

7. A composite article comprising laminations each consisting of a felted fibrous structure, and a binder of synthetic resin and bitumen, said laminations consolidated and held together into a unitary mass by said binder.

8. A felted fibrous structure containing bitumen in particle form, said structure saturated with a synthetic resin.

9. A felted fibrous structure suitable for pressing and curing, and containing synthetic resin and bitumen in sub-divided form.

10. A structure of felted fibers suitable for pressing and curing, and containing bitumen in particle form and synthetic resin in the form of an impregnation.

11. A preformed felted sheet containing bitumen in particle form between the fibers thereof, said sheet impregnated with a synthetic resin.

12. A preformed felted sheet containing bitumen in particle form between the fibers thereof, said sheet impregnated with a synthetic resin, the amount of said resin in the surfaces of said article being greater per unit of volume than the amount at the center thereof.

13. A process of making articles containing synthetic resin which comprises forming a structure of felted fibers containing a binder substance, said structure being saturatable, and saturating said structure with a synthetic resin, afterward pressing and curing said structure.

14. A process of producing structures containing combined binders of bitumen and synthetic resin, which comprises introducing said binders into said structures at separate stages and amalgamating said binders in said structures by heating and pressure.

15. A process of producing structures containing combined binders which comprises providing a felted fibrous structure and introducing dissimilar binder substances therein in separate stages, afterward interfusing said binders under heat and pressure.

16. A process of producing an article which comprises forming a felted structure of fibers containing a binder substance in particle form intermeshed between the fibers of said structure, said structure being saturatable, and saturating said structure with a synthetic resin, afterward heating and curing said structure.

17. A process of producing an article which comprises providing a pulp of feltable fibers in liquid suspension, said pulp containing a comminuted binder substance, felting an article from said pulp having an open and saturatable character, impregnating said article with a synthetic resin, and heating, pressing and curing said article.

18. A process of producing articles which comprises forming a felted structure of fibers and a binder in comminuted form, said structure being saturatable and having the properties of plastic flow under heat and pressure, saturating said structure with dissimilar binder substances, one of said binder substances being bituminous and the other substance comprising an uncured synthetic resin forming a mold charge from said structure and molding said charge under heat and pressure sufficient to amalgamate said binder substances and to cure said synthetic resin.

19. A felted structure comprising fibers in felted formation, and a composite binder of synthetic resin and rubber.

20. An article comprising a fibrous material, rubber, and a synthetic resin, and felted fibrous structure containing rubber in particle form, said structure saturated with a synthetic resin.

21. A process of making articles which comprises initially forming a structure from pulp containing a binder substance to approximate shape, drying said shape, impregnating said shape with a synthetic resin, and curing said shape under heat and pressure.

22. A process of producing an article which comprises forming a felted structure of fibers containing a bituminous binder substance in discontinuous form, said structure being saturatable, and incompletely saturating said structure with a synthetic resin, afterward heating and curing said structure.

23. A process of making an article containing combined binder substances which comprises forming a felted shape containing a binder substance, preforming said shape to another shape, saturating said shape with a synthetic resin, and treating said shape by heat and pressure.

CHARLES L. KELLER.